T861025

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED APRIL 15, 1969

861 O.G. 703

665,767

PROCESS FOR MEASURING POLYMER CONTENT

Okan Ekiner, 1401 Maryland Ave., Wilmington, Del. 19805, and Edward Peter Goffinet, Jr., 2403 Annwood Drive, Wilmington, Del. 19803

Filed Sept. 6, 1967. Published Apr. 15, 1969

Class 260—80.78

1 Sheet Drawing. 11 Pages Specification

Polymer content of a solution containing a plurality of volatile constituents, such as solvent, monomers, etc., is monitored by (1) vaporizing a portion of the volatile constituents from the solution, as by stripping the solution with organic solvent vapor; (2) condensing a small portion (e.g., less than about five mole percent, preferably less than two mole percent) of the vaporized portion to a condensate composition substantially the same as the composition of volatile constituents in the polymer solution; and (3) comparing the refractive index of the condensate with that of the solution, as with a differential refractometer such as is described in United States Patent No. 2,612,-814. Polymer content is then determined, e.g., by inspecting a plot of instrument output versus polymer content. Temperature and pressure of vaporization and condensation may be taken into account in calibrating the said plot. The invention is described in connection with polymerization of ethylene, propylene, and a non-conjugated hydrocarbon diene but is broadly applicable to determining the content of any non-volatile component in a solution of a plurality of volatile constituents so long as an appreciable difference exists between refractive indices of the various constituents.

April 15, 1969 O. EKINER ET AL DEF. PUB. T861025
PROCESS FOR MEASURING POLYMER CONTENT SN - 665767
Filed Sept. 6, 1967
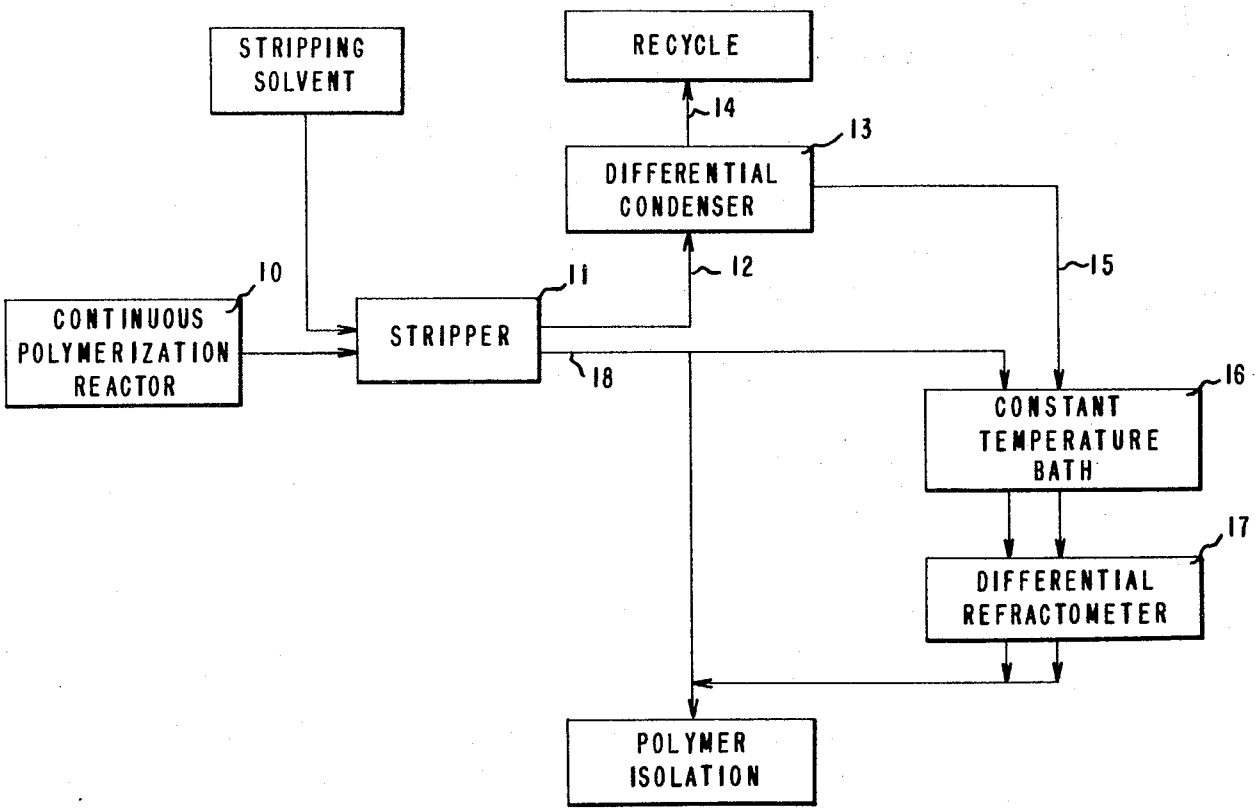
INVENTORS
OKAN EKINER
EDWARD PETER GOFFINET JR.
BY Francis A. Painter
ATTORNEY